UNITED STATES PATENT OFFICE.

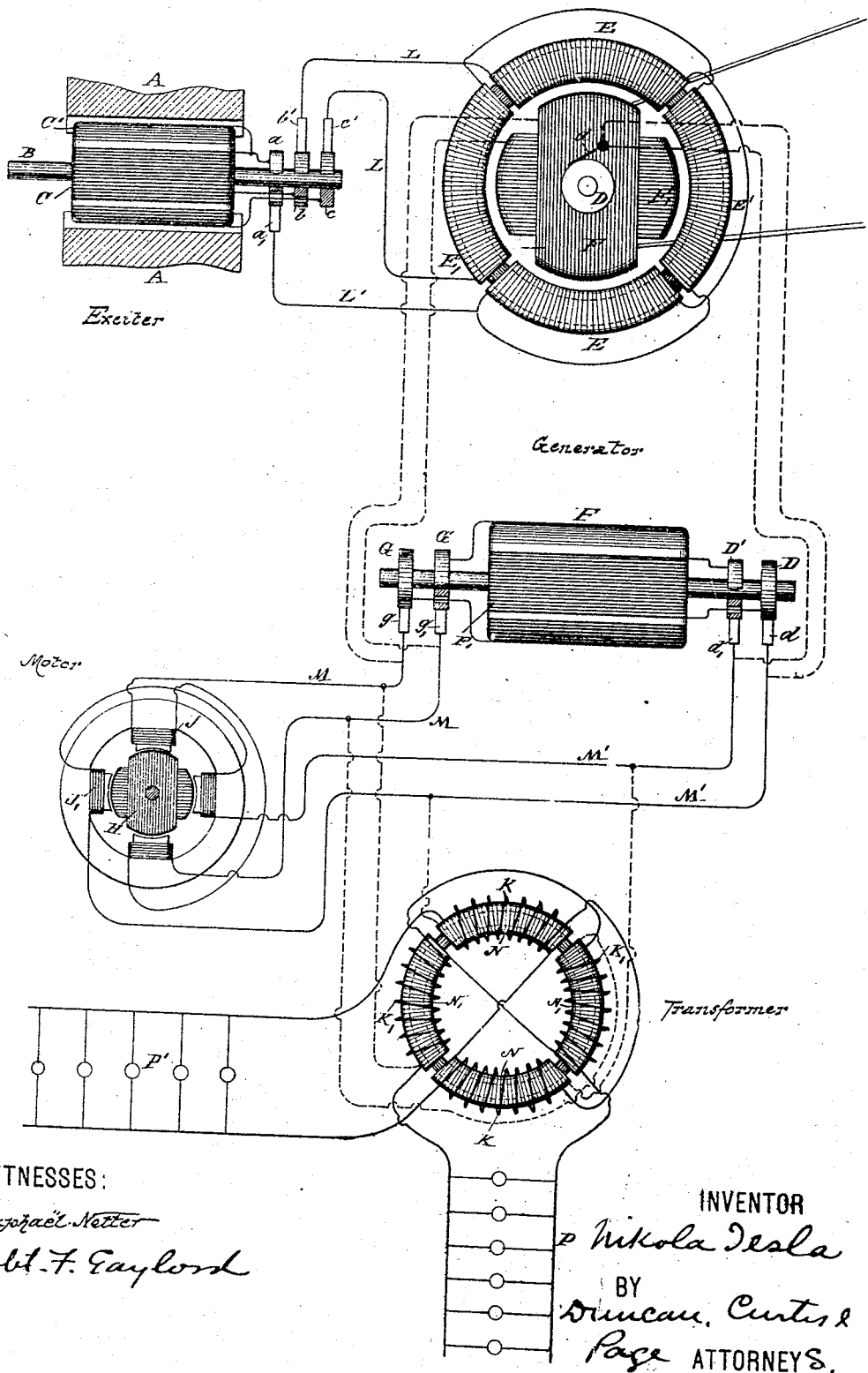

NIKOLA TESLA, OF NEW YORK, N. Y., ASSIGNOR TO THE TESLA ELECTRIC COMPANY, OF SAME PLACE.

DYNAMO-ELECTRIC MACHINE.

SPECIFICATION forming part of Letters Patent No. 390,721, dated October 9, 1888.

Application filed April 28, 1888. Serial No. 272,153. (No model.)

*To all whom it may concern:*

Be it known that I, NIKOLA TESLA, a subject of the Emperor of Austria, from Smiljan, Lika, border country of Austria-Hungary, now residing at New York, in the county and State of New York, have invented certain new and useful Improvements in Electric Generators, of which the following is a specification, reference being had to the drawing accompanying and forming a part of the same.

My present invention relates, chiefly, to the alternating-current system invented by me and described in prior patents, notably Nos. 381,968 and 382,280, of May 1, 1888, in which the motors or transformers, or generally the converters, are operated by a progressive shifting or movement of their magnetic poles produced by the co-operative action of independent magnetizing-coils through which pass alternating currents in proper order and direction. In my said system, as I have heretofore shown, I employed a generator of alternating currents in which there were independent induced or generating coils corresponding to the energizing-coils of the converter, and the relations of the generator and converters were generally such that the speed of rotation of the magnetic poles of the converter equaled that of the armature of the generator.

To secure the greatest efficiency, it is necessary to run the machines at a high speed, and this is true not only of those generators and motors which are particularly adapted for use in my system, but of others. The practicability of running at very high speeds, however, particularly in the case of large generators, is limited by mechanical conditions, in seeking to avoid which I have devised various plans for operating the system under efficient conditions, although running the generator at a comparatively low rate of speed.

My present invention consists of another way of accomplishing this result, which in certain respects presents many advantages. According to the invention, in lieu of driving the armature of the generator at a high rate of speed, I produce a rotation of the magnetic poles of one element of the generator and drive the other at a different speed, by which similar results are obtained to those secured by a rapid rotation of one of the elements.

I shall describe this invention by reference to the diagram drawing hereto annexed.

The generator which supplies the current for operating the motors or transformers consists in this instance of a subdivided ring or annular core wound with four diametrically-opposite coils, E E'. Within the ring is mounted a cylindrical armature-core wound longitudinally with two independent coils, F F', the ends of which lead, respectively, to two pairs of insulated contact or collecting rings, D D' G G', on the armature-shaft. Collecting-brushes $d$ $d'$ $g$ $g'$ bear upon these rings, respectively, and convey the currents through the two independent line-circuits M M'. In the main line there may be included one or more motors or transformers, or both. If motors be used, they are constructed in accordance with my invention with independent coils or sets of coils J J', included, respectively, in the circuits M M'. These energizing-coils are wound on a ring or annular field or on pole-pieces thereon, and produce by the action of the alternating currents passing through them a progressive shifting of the magnetism from pole to pole. The cylindrical armature H of the motor is wound with two coils at right angles, which form independent closed circuits.

If transformers be employed, I connect one set of the primary coils, as N N, wound on a ring or annular core, to one circuit, as M', and the other primary coils, N' N', to the circuit M. The secondary coils K K' may then be utilized for running groups of incandescent lamps P P'.

With the generator I employ an exciter. This consists of two poles, A A, of steel permanently magnetized, or of iron excited by a battery or other generator of continuous currents, and a cylindrical armature-core mounted on a shaft, B, and wound with two longitudinal coils, C C'. One end of each of these coils is connected to the collecting-rings $b$ $c$, respectively, while the other ends are both connected to a ring, $a$. Collecting-brushes $b'$ $c'$ bear on the rings $b$ $c$, respectively, and conductors L L convey the currents therefrom through the coils E and E' of the generator. L' is a common return-wire to brush $a'$. Two independent circuits are thus formed, one including coils C of the exciter and E E of the generator, the other coils C' of the exciter and E' E' of the generator. It results from this that the operation of the exciter produces a progressive movement of the magnetic poles of the annular field-core of the generator, the shifting or rotary movement of said poles being synchronous with the rotation of the exciter armature. Considering the operative conditions of a system thus established, it will be found that when the exciter is driven so as to energize the field of the generator the armature of the latter, if left free to turn, would rotate at a speed practically the same as that of the exciter. If under such conditions the coils F F' of the generator-armature be closed upon themselves or short-circuited, no currents, at least theoretically, will be generated in the said armature-coils. In practice I have observed the presence of slight currents, the existence of which is attributable to more or less pronounced fluctuations in the intensity of the magnetic poles of the generator-ring. So, if the armature-coils F F' be closed through the motor, the latter will not be turned as long as the movement of the generator-armature is synchronous with that of the exciter or of the magnetic poles of its field. If, on the contrary, the speed of the generator-armature be in any way checked, so that the shifting or rotation of the poles of the field becomes relatively more rapid, currents will be induced in the armature-coils. This obviously follows from the passing of the lines of force across the armature-conductors. The greater the speed of rotation of the magnetic poles relatively to that of the armature the more rapidly the currents developed in the coils of the latter will follow one another, and the more rapidly the motor will revolve in response thereto, and this continues until the armature-generator is stopped entirely, as by a brake, when the motor, if properly constructed, runs at the same speed with which the magnetic poles of the generator rotate.

The effective strength of the currents developed in the armature-coils of the generator is dependent upon the strength of the currents energizing the generator and upon the number of rotations per unit of time of the magnetic poles of the generator; hence the speed of the motor-armature will depend in all cases upon the relative speeds of the armature of the generator and of its magnetic poles. For example, if the poles are turned two thousand times per unit of time and the armature is turned eight hundred, the motor will turn twelve hundred times, or nearly so. Very slight differences of speed may be indicated by a delicately-balanced motor.

Let it now be assumed that power is applied to the generator-armature to turn it in a direction opposite to that in which its magnetic poles rotate. In such case the result would be similar to that produced by a generator the armature and field-magnets of which are rotated in opposite directions, and by reason of these conditions the motor-armature will turn at a rate of speed equal to the sum of the speeds of the armature and magnetic poles of the generator, so that a comparatively low speed of the generator-armature will produce a high speed in the motor.

It will be observed in connection with this system that on diminishing the resistance of the external circuit of the generator-armature by checking the speed of the motor or by adding translating devices in multiple arc in the secondary circuit or circuits of the transformer the strength of the current in the armature-circuit is greatly increased. This is due to two causes: first, to the great differences in the speeds of the motor and generator, and, secondly, to the fact that the apparatus follows the analogy of a transformer, for, in proportion as the resistance of the armature or secondary circuits is reduced, the strength of the currents in the field or primary circuits of the generator is increased and the currents in the armature augmented correspondingly. For similar reasons the currents in the armature-coils of the generator increase very rapidly when the speed of the armature is reduced when running in the same direction as the magnetic poles or conversely.

It will be understood from the above description that the generator-armature may be run in the direction of the shifting of the magnetic poles, but more rapidly, and that in such case the speed of the motor will be equal to the difference between the two rates.

In many applications to electrical conversion and distribution this system possesses great advantages both in economy, efficiency, and practicability.

What I claim is—

1. The combination, with an alternating-current generator having independent energizing or field and independent induced or armature coils, of an alternating-current exciter having generating or induced coils corresponding to and connected with the energizing-coils of the generator, as set forth.

2. In an alternating-current generator, the combination of the elements named and cooperatively associated in the following manner: a field-magnet wound with independent coils each connected with a source of alternating currents, whereby the magnetic poles produced by said coils will be progressively shifted or moved through the field, and an armature-core wound with independent coils, each having terminals from which currents are delivered to the independent external circuits.

3. The system of electrical distribution consisting of the combination, with an alternating-current generator having independent energizing-coils and an armature wound with independent induced coils, of an alternating-current exciter having induced coils corresponding to and connected with the energizing-coils of the generator, and one or more electrical converters having independent inducing or energizing coils connected with the corresponding armature coils of the generator, as herein set forth.

4. The combination, with an alternating-current generator having a field-magnet wound with independent energizing-coils and an armature adapted to be rotated within the field produced by said magnet, of an exciter having induced or generating coils corresponding to and connected with the energizing-coils of the generator, as set forth.

NIKOLA TESLA.

Witnesses:
ROBT. F. GAYLORD,
PARKER W. PAGE.